United States Patent [19]

Endou et al.

[11] Patent Number: 4,792,682
[45] Date of Patent: Dec. 20, 1988

[54] PYROELECTRIC INFRARED TEMPERATURE COMPENSATED DETECTOR

[75] Inventors: Yasushi Endou; Hisao Takahashi; Tetsuaki Kon, all of Fukushima, Japan

[73] Assignee: Kureha Kaqaka Koqyo Kabushiki Kaisha, Tokyo, Japan

[21] Appl. No.: 888,681

[22] Filed: Jul. 21, 1986

Related U.S. Application Data

[63] Continuation-in-part of Ser. No. 707,177, Mar. 1, 1985, abandoned, which is a continuation of Ser. No. 438,608, Nov. 2, 1982, abandoned.

[30] Foreign Application Priority Data

Nov. 15, 1981 [JP] Japan ................. 56-177743

[51] Int. Cl.$^4$ .............................................. G01J 5/00
[52] U.S. Cl. ..................... 250/338.3; 250/349
[58] Field of Search ................ 250/338 PY, 349

[56] References Cited

U.S. PATENT DOCUMENTS

| | | | |
|---|---|---|---|
| 3,453,432 | 7/1969 | McHenry | 250/338 PY |
| 3,581,092 | 5/1971 | Pearsall et al. | 250/349 |
| 4,060,729 | 11/1977 | Byer et al. | 250/338 PY |
| 4,225,786 | 9/1980 | Perlman | 250/349 |
| 4,384,207 | 5/1983 | Doctor | 250/338 PY |
| 4,404,468 | 9/1983 | Kleinschmidt | 250/349 |
| 4,467,202 | 8/1989 | Nakamura et al. | 250/342 |
| 4,514,631 | 4/1985 | Guscott | 250/353 |
| 4,542,294 | 9/1985 | Tamura et al. | 250/338 PY |

FOREIGN PATENT DOCUMENTS 228129  12/1984  Japan ................. 250/338 R

Primary Examiner—Carolyn E. Fields
Attorney, Agent, or Firm—Woodcock Washburn Kurtz Mackiewicz & Norris

[57] ABSTRACT

A pyroelectric infrared detector or infrared ray receiving element comprising a plurality of pyroelectric operating areas, utilizing one of the operating areas as an infrared radiation detection area having a light-transmissive surface electrode. The electrical signal produced in the signal detection area is compensated by an electrical signal produced in another pyroelectric operating area having a light-reflective surface electrode. Temperature drift and noise due to vibration are drastically reduced through the compensation.

12 Claims, 5 Drawing Sheets

PYROELECTRIC INFRARED TEMPERATURE COMPENSATED DETECTOR

This application is a continuation-in-part of application Ser. No. 707,177 filed Mar. 1, 1985, a continuation of application Ser. No. 438,608 filed Nov. 2, 1982, both now abandoned. Both applications are incorporated by reference.

BACKGROUND OF THE INVENTION

1. Field of the Invention

This invention relates to a pyroelectric infrared detector, and more particularly to an infrared ray receiving element in which temperature drift in incoming signals and noise caused by vibration can be eliminated by defining a plurality of pyroelectric operating areas, utilizing one of the operating areas an an infrared signal detection area, and compensating for the electrical signals generated in the signal detection area by using the electrical signals generated in another pyrolectric operating area.

2. Description of the Prior Art

It is well known that a pyroelectric property can be provided by polarizing a high molecular weight film such as, for example, a polymer or copolymer consisting essentially of a vinylidene fluoride, a vinyl fluoride, and an ethylene trifluoride or the other polar monomers. Various kinds of infrared detectors such as fire alarms or intrusion alarms using such a pyroelectric film have been proposed. However, since the high molecular weight pyroelectric film, in general, has a pyroelectric as well as a pyroelectric properties, it generates an electrical signal due to external vibration, the external vibration often becomes a cause of large noises. In order to eliminate these noises, U.S. Pat. No. 3,877,308, for example, has proposed a pyroelectric element constituted by disposing a plurality of pyroelectric operating areas with electrodes on both surfaces of a sheet of high molecular pyroelectric film. The element utilizes only one of these pyroelectric operating areas for infrared signal detection for radiant heat from the outside. The detection area is coupled with at least one of the remaining pyroelectric operating areas through respective electrodes of different polarities. The pyroelectric signals resulting only from radiant heat can be obtained by compensating for the electrical signal generated in the signal detection areas with the electrical signals generated in another pyroelectric operating area.

In cases where such a specific pyroelectric operating area is used for noise compensation as mentioned above, it is preferable that the quantity and quality of noises due to environmental conditions surrounding the pyroelectric operating areas for detection and compensation be equal as much as possible. However, in the case of the U.S. Pat. No. 3,877,308, the aforesaid conditions are not sufficient since the pyroelectric operating area for compensation is not disposed at a place where it is influenced by radiant heat. Accordingly, where comparatively strong radiant heat is to be detected by means of a pyroelectric element having a low sensitivity, the compensation for the element disclosed in the U.S. patent is effective, but there is a large amount of noise due to the temperature drift when the sensitivity of the pyroelectric element is increased.

In addition, in the U.S. Pat. No. 3,453,432, there is proposed an infrared detector comprising pyroelectric operating areas such that radiant heat falls on a sheet of pyroelectric material located within the infrared detector. A light-reflective electrode such as aluminum is disposed on the light receiving surface side of one operating area which a light-absorptive electrode such as gold black, for example, is disposed on the light receiving surface side of the other operating area. The operating area having the light-absorptive electrode serves as a detection element and the operating area having the light-reflective electrode serves as a compensation element. In this U.S. patent, since an inorganic substance such as ceramic and the like, for example, is used as pyroelectric material, and the two pyroelectric operating areas are both located within a region into which the radiant rays are entered, it can be expected that the noises due to environmental conditions will be further decreased. It is, however, further desired to provide a lower noise and driftless device.

SUMMARY OF THE INVENTION

It is therefore a primary object of the present invention to provide a pyroelectric infrared detector in which the temperature drift included in the input signal and noise due to vibration can be remarkably reduced.

Before reaching the present invention, the inventors have produced a similar pyroelectric infrared detector by using a high molecular pyroelectric film as pyroelectric material and defining thereon two pyroelectric operating areas having light-reflective and light-absorptive electrodes, respectively. As the result of experiment on noise, it was found that the generation of noise is drastically reduced as compared with the case of the U.S. Pat. No. 3,877,308. As the result of further consecutive research, the inventors have succeeded in developing a "quieter" infrared detector, as compared with the U.S. Pat. No. 3,453,432, which is constituted by disposing a light-transmissive surface electrode on the pyroelectric operating area at the detection side, and a light reflective surface electrode on the pyroelectric operating area at the compensation side.

The pyroelectric infrared detector according to the present invention comprises at least two electrode made of a light-transmissive and conductive film such as indium oxide-tin oxide (ITO), for example, to be used as electrode at the light receiving side, and a light-reflective electrode made of a light-reflective and conductive film such as aluminum. These films coat the same or different high molecular weight pyroelectric film, so that both areas define an incident passage for an infrared ray incident window. The electrostatic charge produced at the pyroelectric operating area having the transmissive electrode is used for detecting the infrared signal, with the electrostatic charge produced at the pyroelectric operating areas having the reflective electrode being used for compensation.

As the light-transmissive electrodes usable in this invention, a transparent film (approximately 400–2000 Å in thickness, for example) of conductive ceramic and the like such as ITO, tin oxide (plus antimony oxide) and the like, or a semitransparent metallic thin film (a deposited film of approximately 30–200$\mu$ in thickness, for example) such as gold, platinum, silver, nickel, chromium, aluminum, copper and the like may be used. On the other hand, as a reflective electrode, a film made of aluminum, tin, nickel, chromium, antimony, iron and other white metals and having a thickness of approximately 500–3000 Å (sufficient not to transmit any light) may be used. These electrodes are formed on the surface of the film by use of an ordinary method such as deposition, sputtering, plating or the like. Several electrodes to be used as opposing electrodes are required on the rear side of the film on which the aforesaid transmissive and reflective electrodes are attached, but these opposing electrodes may be made in the form of thin film of any appropriate material. However, in this case, it is preferable that these two electrodes are of the same material and thickness so that there is no difference between them in the sensitivity for signals and noises. In the case where the transmissive and reflective electrodes are disposed on one sheet of pyroelectric film, one common electrode may be used instead of the opposing electrodes.

Although polyvinylidene fluoride is considered to be the best high molecular weight material used for the high molecular weight pyroelectric film in this invention, a pyroelectric high molecular weight substance such as polymer, copolymer or the like consisting essentially of vinyl fluoride, trifluoroethylene or another polar monomer can be used as well. It should be understood that the polyvinylidene fluoride quoted herein is not limited to vinylidene fluoride homopolymers, but may also include copolymers each of which contains vinylidene fluoride in the amount of more than approximately 50 mol percent, and one or more comonomers which are copolymerizable with the vinylidene fluoride such as fluorine-containing olefins, e.g., vinyl fluoride, chlorofluorovinylidene, chlorotrifluoroethylene, tetrafluoroethylene, hexafluoropropylene.

A high molecular weight pyroelectric film having reflective and transmissive electrodes as used in the infrared detector according to this invention, is different in its absorptive property for infrared rays from units in which absorptive and reflective electrodes as disclosed in the U.S. Pat. No. 3,453,432 are used. In general, higher sensitivity to infrared rays is obtained by such a compensation type infrared detector comprising a pyroelectric film having an absorptive electrode on its detecting side, and a reflective electrode on its compensation side, than that of the infrared detector in which infrared rays are absorbed only by the pyroelectric film itself in accordance with this invention. However, it was found that the noise in the device of this invention was reduced at least by half as compared with the infrared detector utilizing the absorptive electrode on the detection side. Since the sensitivity can be electrically amplified so that the noise levels are equal, it will be understood that the infrared detector of the present invention represents a higher sensitivity; that is, it provides an improved signal-to-noise ratio.

The reason why the noise in the infrared detector of this invention utilizing the transmissive electrode is drastically decreased as compared with that of the infrared detector utilizing the absorptive electrode in the pyroelectric operating area for compensation is not clearly elucidated yet, but one conceivable reason is as follows. In general, the light-absorptive electrode made of gold black or the like according to the prior art can absorb energy corresponding to the temperature of its environment, but the absorption of ambient energy by the reflective or transmissive electrode is not too good. Hence, the compensation is inaccurate; this amounts to increased noise. According to the present invention, ambient energy absorption by the effective and transmissive electrodes is more nearly comparable. The noise resulting from utilizing the light-transmissive electrode and making the compensation by means of the reflective electrode is reduced. In addition, the high molecular weight pyroelectric film is formed very thin as compared with ceramic thermal pyroelectric materials and has a reduced thermal conductivity decreasing crosstalk between the two sides of the detector. Furthermore, the prior art utilizing a high molecllar weight pyroelectric film with the light-absorptive electrode is operated in such state that a comparatively high sensitivity, that is essential, is more enhanced. These facts may increase the noise in the case of the light-absorptive electrode.

BRIEF DESCRIPTION OF THE DRAWINGS

The noble features of the present invention, as well as the invention itself, and the objects and advantages thereof will be better understood from the following description taken in conjunction with the accompanying drawings in which.

DESCRIPTION OF THE PREFERRED EMBODIMENT

Figure 1:
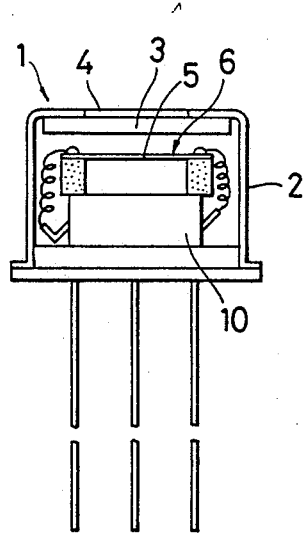
FIG. 1 is a sectional view of the infrared detector in accordance with the present invention.
Figure 2A:
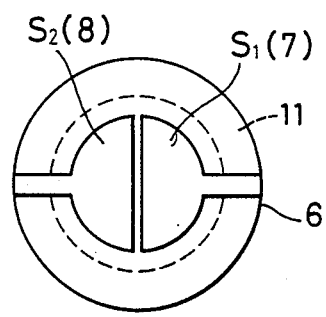
FIGS. 2A and 2B show a plan and sectional views of a pyroelectric element used in this invention.
Figure 2B:
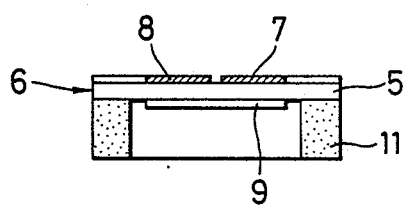

Referring to FIGS. 1, 2A and 2B, an infrared detector 1 according to the present invention comprises a casing 2, a light-transmissive window 4 located at the front (topside of FIG. 1) of the casing 2 and having a filter 3 made of infrared ray transmissive material such as silicon, germanium, sapphire or the like, for example, and a pyroelectric element 6 disposed behind thereof and having a pyroelectric polyvinylidene fluoride film 5 as a base plate. As clearly seen from FIGS. 2A and 2B, a light-transmissive electrode 7 made of a sputtered ITO film and a light-reflective electrode 8 made of a deposited aluminum film are disposed respectively on the light incident surface (filter side) of the film 5 of the pyroelectric element 6. The window 4 allows infrared radiation from a source facing the window 4 to fall on both electrodes 7 and 8. The use of transparent and reflective electrodes, rather than one such electrode and an absorptive electrode like the blackened gold electrode used in the aforesaid U.S. Pat. No. 3,453,432, is very important. The heat masses of the former pair of electrodes are more closely related to one another than is the mass of either to the much larger thermal mass of a comparably sized blackened electrode. Matching the heat mass of the detecting and compensating electrodes is an important aspect of the success of the invention. The transparent electrode 7 generates a much lower signal amplitude than would blackened or similar absorptive electrode. However, the cancellation of noise with the reflective electrode is much easier because the noise levels of the two detectors $S_1$ and $S_2$ are comparable. The superior low noise output of this invention is achieved even with extremely simple circuitry. A common opposing electrode 9 made of a deposited film is disposed on the rear surface of the film 5. In this case, the region in which the ITO film is disposed corresponds to a pyroelectric operating area $S_1$ for detecting the infrared signals, and the other region in which the aluminum film is disposed as incident surface electrode corresponds to a pyroelectric operating area $S_2$ for compensation. The transmissive electrode 7 and the reflective electrode 8 are connected to an FET amplifier 10 (FIG. 1). A ring 11 is used as a rack stand for the pyroelectric film elements.

Figure 3:
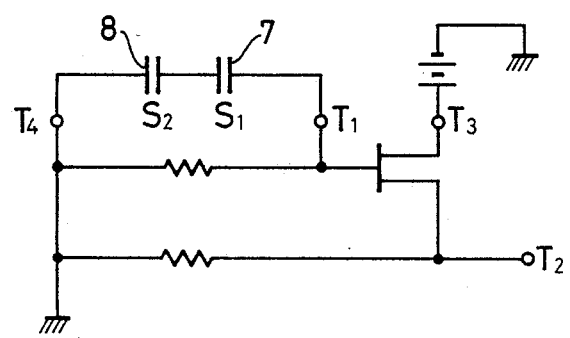
FIG. 3 is an amplifier circuit using an FET.

FIG. 3 shows an amplifier circuit for the FET 10. The transparent electrode 7, corresponding to the pyroelectric operating block $S_1$ for detection, is connected to the gate of the FET 10 through a terminal $T_1$, and the reflective electrode 8, corresponding to the pyroelectric operating block $S_2$ for compensation, is grounded through a terminal $T_4$. The detection elements $S_1$ and $S_2$ are polarized in the same direction; i.e., the polarities of the film 5 in the radiation detector area $S_1$ and temperature compensation area $S_2$ are identical. Accordingly, the gate of FET 10 receives a signal obtained through the electrostatic charge produced at the pyroelectric operating area $S_1$ subtracted by the electrostatic charge produced at the pyroelectric operating area $S_2$. The input signal to the gate of FET 10 is impedance-converted therein and outputted at the source terminal $T_2$ as an output current. The drain terminal $T_3$ of FET is connected to a power source.

In the above example, the pyroelectric operating areas $S_1$ and $S_2$ used for detection and compensation, respectively, are disposed on a single sheet of high molecular weight pyroelectric film. Tt is preferable that the areas $S_1$ and $S_2$ be on the same plane parallel to the incident window and be symmetrically arranged about the intersection of this plane and the center line of the incident window. Alternatively, the areas $S_1$ and $S_2$ may be formed on the same spherical surface and areas $S_1$ and $S_2$ may be different in size from each other.

Figure 4:
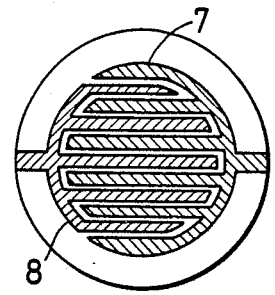
FIG. 4 is a plan view illustrating a modification of pyroelectric operating areas of the pyroelectric element.

In case where the both pyroelectric operating areas are to be disposed on one sheet of film, the transmissive electrode 7 and the reflective electrode 8 may be constructed in comb form and interdigitated as shown in FIG. 4. In this case, since the light incident on the both pyroelectric operating areas is more uniformly distributed, a further reduction of noise can be expected.

Figure 10:
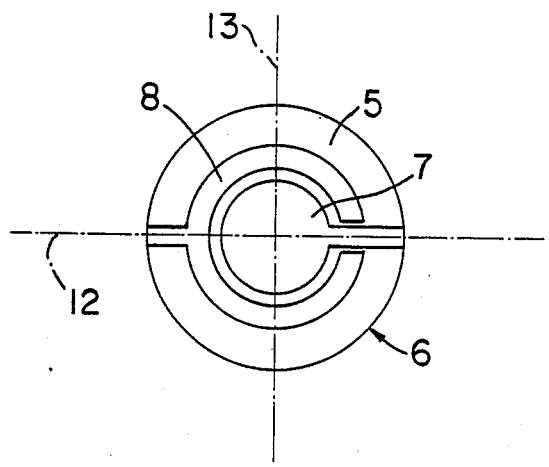
FIG. 10 is a plan view of a third embodiment detector of the invention.
Figure 11:
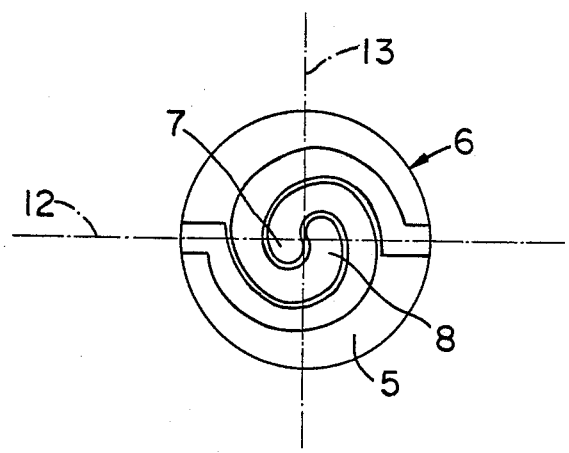
FIG. 11 is a plan view of a fourth embodiment detector of the invention.

In FIG. 10, a disk shaped (i.e. solid circular) tranmissive electrode 7 is centered on the film 5 and element 6 and substantially coaxially surrounded by an annular (i.e. hollow circular) reflective electrode 8, a small gap being provided in electrode 8 for a conductor leading from electrode 7. In FIG. 11, a pair of identical spiral-shaped electrodes 7 and 8 are provided rotated 180° and interlaced with one another.

The light transmissive electrode and the light-reflective electrode 8 of each embodiment in FIGS. 10 and 11 are spread out over each of four equal quadrants of the element 6 and film 5, defined by orthogonal broken lines 12 and 13, centered at the center of the pyooelectric element 6 and film 5. This is true regardless of the angular position of the pair of orthogonal lines 12 and 13 around the center of element 6 and film 5. Such electrode arrangements can respond more uniformly to uneven lighting and/or heating conditions across the element 6 and film 5. The embodient of FIG. 4 also shares this characteristic, but is not as symmetric as are the embodiments of FIGS. 10 and 11. The embodiment of FIG. 10 is identically symmetric about horizontal center line 12. Ignoring the gap in annular electrode and the leads from each electrode 7 and 8, which can be made quite small, each electrode 7 and 8 of this embodiment is equally divided among the four quadrants regardless of the angular position of orthogonal lines 12 and 13 around the film 5 and element 6. The embodiment of FIG. 11 is rotationally symmetric. As a result, regardless of the angular position of the orthogonal lines 12 and 13 around the center of the film 5 or of pyroelectric element 6 in this embodiment, opposing quadrants of the film 5 and detector 6 contain identical segments of each electrode 7 and 8.

In addition, it is to be understood that the pyroelectric operating areas for detection and compensation will not necessarily be limited to one area each, but may each be composed of more than two areas.

The electrodes 7 and 8 for the pyroelectric operating areas $S_1$ and $S_2$ having the same pyroelectric sensitivity are in general formed with the same size, and, referring to the embodiments of FIGS. 10 and 11, with the same size in each quandrant. However, in case the pyroelectric sensitivities are different from one another, the size ratio of $S_1$ and $S_2$ can be appropriately selected in consideration of the pyroelectric sensitivity of the corresponding operating areas.

In the circuit of FIG. 3, it is shown that the electrodes on both pyroelectric operating areas are directly coupled to the FET in such a manner that the electrostatic charges produced are subtracted. It may be possible to use an appropriate compensation circuit which compensates for the electrical signals individually taken out of the electrodes $S_1$ and $S_2$ by use of a differential amplifier.

There are hereinafter shown several examples of the infrared detector of this invention as well as the results of comparison with the other conventional infrared detectors. In the examples illustrated, the same pyroelectric film as in the case of the example (A) according to the present invention is a pyroelectric film obtained by polarizing the identical vinylidene fluoride film having the same diameter and thickness as well as almost identical pyroelectric sensitivity.

EXAMPLE

The pyroelectric infrared detector (A) based on the present invention having a structure similar to that shown in FIGS. 1-3 was produced according to the following specifications. The case is 8 mm in outer diameter and 6 mm in height and includes a silicon filter measuring 5 mm in diameter and 0.5 mm in thickness, as an incident window. A pair of pyroelectric elements formed of a pyroelectric polyvinylidene fluoride film having a diameter of 6 mm and thickness of $6\mu$ is arranged with a clearance of 0.5 mm from the filter. A sputtered ITO film having a thickness of 500 Å is disposed as a transmissive electrode on the pyroelectric film, and deposited layers having thicknesses of 1000 Å are affixed as a reflective surface electrode and an opposing rear common electrode on both side of the pyroelectric film. In details, the two surface electrodes are so formed that their outer periphery coincides with the circumference of a circle having a diameter of 4 mm. Each electrode is formed in the shape of a half-moon and a clearance of 0.7 mm is provided between them. The common electrode on the rear surface is formed such that it coincides with the 4 mm circle shape of surface electrodes.

The following infrared detectors represented by (B), (C), (D) and (E) were prepared for comparison with the infrared detector (A) of the present invention.

(B) . . . An infrared detector, in which there is used a pyroelectric element having a pyroelectric operating area for detection, comprising a circular ITO film having a diameter of 2.5 mm and a thickness of 500 Å disposed on the central part of the same pyroelectric polyvinylidene fluoride film as that of (A), and an aluminum layer having the same diameter and a thickness of 1000 Å disposed on the rear surface thereof, but having no pyroelectric operating area for compensation. Otherwise (B) is an infrared detector similar to (A) with the exception that $S_2$ is omitted from the circuit diagram in FIG. 3 and the electrode 8 is directly coupled to the terminal 4.

(C) . . . An infrared detector identical to the detector (A) except as follows. A pyroelectric element for detection ad a pyroelectric element for compensation are respectively provided on both side of a spreading ring member such as shown in FIG. 2B. The pyroelectric element for detection has the same ITO film as the infrared detector (B) and is mounted on the top side of the ring member. The pyroelectric element for compensation is mounted on the under side of the ring member, has the same electrode construction as the detector (B), and its aluminum electrode is provided on the same pyroelectric polyvinylidene fluoride film as the detector (A), but disposed on the side of the ring member. The ring side electrode of the element, on the filter side of the ring surface and the ring side electrode of the other element on the rear surface of ring are electrically coupled through the ring, and the electrode located farthest from the filter is coupled to the ground terminal $T_4$.

(D) . . . An infrared detector identical to the detector (A) with the exception that it possesses a light-absorptive pyroelectric operating area constituted by using an aluminumm deposited film of 500 Å as a ground layer instead of the light-transmissive ITO film of the element used in the detector (A) having formed thereon a gold black film of approximately 10µ, by a deposition process.

(E) . . . Commercially available pyroelectric infrared detectors with the following features (II, III, and IV are based on catalogues).

(I) Case: Almost the same as that of the present invention
(II) Silicon plate
(III) Pyroelectric Base: $LiTaO_2$ 50
(IV) Electrode diameter: 2.5 mm φ
(V) Pyroelectric operating area for compensation not provided.

Figure 5:
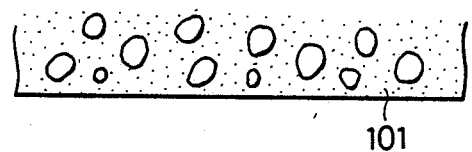
FIG. 5 is a schematic diagram illustrating the arrangement of infrared detectors used in comparative experiment.
Figure 5:
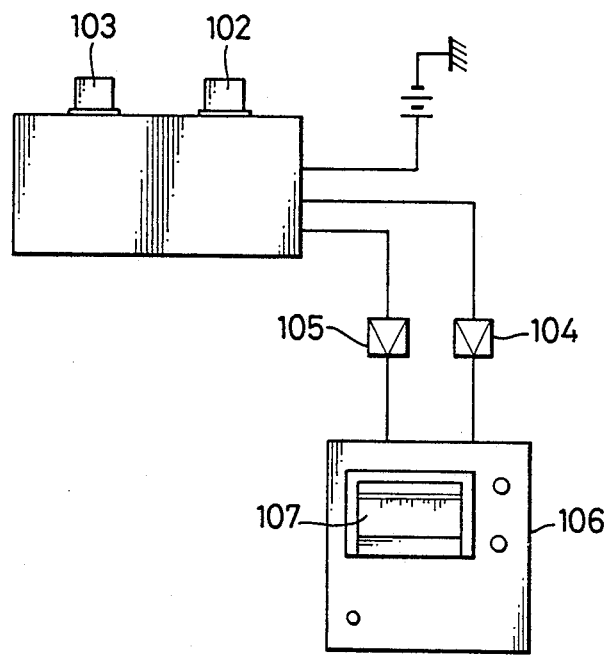
Figure 6:
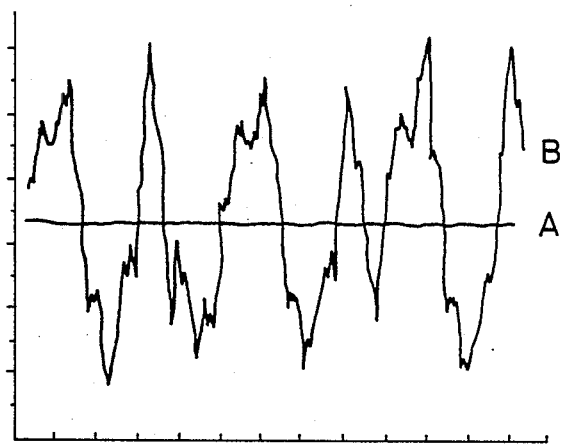
FIGS. 6-9 show charts for various noise signals.
Figure 7:
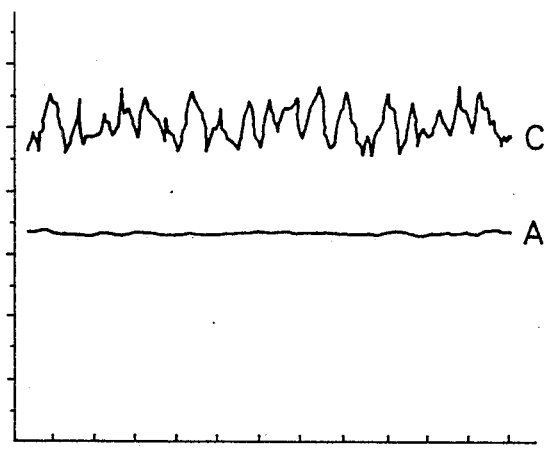
Figure 8:
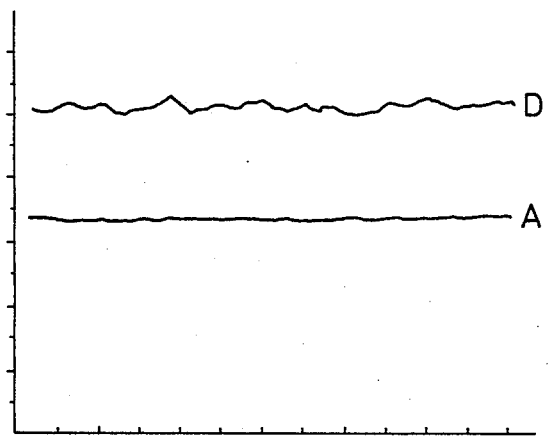
Figure 9:
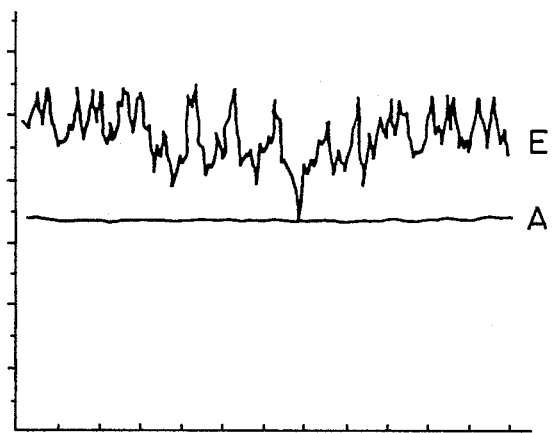

Experiments directed at comparison of noise signals output by the detector (A) of the invention and by the other detector (B) through (E) was carried out by juxtaposing the infrared detector (A) and one of the infrared detectors (B)-(E) in front of a white wall (101) of a crowded laboratory with a distance of 1 m therebetween as shown in FIG. 5. The sensor (A) and a comparison detector are represented by reference numerals 102 and 103, respectively, and they are so disposed that the filter surfaces thereof are in parallel with the wall surface and connected to a multi-point recorder 106 through respective amplifiers 104 and 105. Changes of the signal currents from the respective sensors are recorded as voltage changes on a chart 107 with passage of time.

FIGS. 6, 7, 8 and 9 show comparison graphs for noise signals obtained from the detectors (A)-(B), (A)-(C), (A)-(D) and (A)-(E), respectively, by adjusting the amplifiers to have the same sensitivity with each other. As the result, it was recognized that the detector (A) has a noise signal level as low as approximately two digits as compared with the comparison detectors (B), (C) or (E), and has a noise signal of less than one fourth as compared even with the one such as the detector (D) in which the electrode of pyroelectric operating area for compensation is made of gold black.

In the next step, comparative measurements for sensitivity were conducted for the infrared detectors (A)-(E). As a source of infrared rays, an IRTS-20 manufactured by the Japan Sensor Corporation was disposed in front of the detector with a light source temperature set at 500° K. A chopper having a chopping cycle of 20 Hz was placed ahead of the detector. The sensitivity for each detector is sought as a voltage curve by using a wave analyzer Hewlett Packard 3581A.

As the results of such measurements, it was found that the ratio of sensitivity, where the value for the detector (A) is assumed to be 100, is 110, 90, 150 and 140 for the comparison detectors (B), (C), (D) and (E), respectively.

While there has been described and illustrated what is at present considered to be the preferred embodiments of the present invention, it will be appreciated that numerous changes and modifications are likely to occur to those skilled in the art, without departing from the spirit and scope of the present invention.

What is claimed is:

1. A pyroelectric infrared radiation detector comprising:
   a housing;
   a pyroelectric film element disposed in the housing;
   a window in said housing permitting infrared radiation to fall on a surface of the film element;
   the film element being divided into an infrared radiation detection area and a temperature compensation area;
   the film element in said infrared radiation detection area having a light-transmissive electrically conductive film electrode defining a first electrode disposed on the surface of the film element exposed to incident infrared radiation and the film element in the compensation area having a light-reflective electrically conductive electrode defining a second electrode disposed on the surface of the film element exposed to incident infrared radiation; and
   a third electrode being disposed on another surface of the pyroelectric film element on which the infrared radiation is not incident;
   each of said first and second electrodes being disposed on the surface of the film in each of four equal quarters of the film element around the center of the film element.

2. The detector of claim 1 wherein the film element is a single sheet and is used to form both said radiation detection area and said temperature compensation area.

3. A pyroelectric infrared detector according to claim 1, wherein said light-transmissive electrode is made of a film of conductive material selected from the group consisting of indium oxide-tin oxide, tin oxide, antimony oxide, gold, platinum, silver, nickel, chromium, aluminum and copper.

4. A pyroelectric infrared detector according to claim 1, wherein said light-reflective electrode is made of a white metal selected from the group consisting of aluminum, tin, nickel, chromium, antimony, and iron, and has a thickness sufficient to prevent light transmission.

5. A pyroelectric infrared detector according to claim 1, wherein said film element is selected from the group consisting of polyvinylidene fluoride, copolymers consisting essentially of vinylidene fluoride, polymers and copolymers consisting essentially of vinyl fluoride, and polymers and copolymers consisting essentially of trifluoroethylene.

6. A pyroelectric infrared detector according to claim 1, wherein the detection area and compensation area are electrically connected in such a manner that the electrostatic charges generated thereon are subtracted from one another.

7. A pyroelectric infrared detector according to claim 1, wherein light transmissive electrode and the light-reflective electrode are formed into interdigitated comb shapes.

8. A pyroelectric infrared radiation detector according to claim 1 wherein the transmissive-detection electrode is disc shaped and disposed on the surface of the film element at the center thereof and the reflective-compensation electrode is annular shaped and is disposed on the film element encircling the detection electrode.

9. A pyroelectric infrared radiation detector according to claim 1 wherein said detection and compensation electrodes are spiral-shaped and interlaced each other.

10. A pyroelectric infrared radiation detector comprising:
a housing;
a pyroelectric film element disposed in the housing;
a window in said housing located to permit infrared radiation to fall on a first surface of the film element;
a light-transmissive electrically conductive film electrode disposed on the first surface of the film element;
a light-reflective electrically conductive electrode disposed on the first surface of the film element; and
a third electrode being disposed opposite the light-transmissive and the light reflective electrodes on a surface of the pyroelectric film element opposite the first surface.

11. The detector of claim 10 further comprising:
circuitry coupling the light-transmissive and the light reflective electrodes so as to cancel equal charges on the two electrodes generated from environmental conditions common to both electrodes.

12. The detector of claim 11 wherein said circuitry consists essentially of:
a field effect transistor
a lead coupling either one of the light-transmissive and light reflective electrodes with the gate electrode of the field effect transistor
a lead coupling the remaining one of the light-transmissive and light-reflective electrodes with a ground potential;
a resistor between said two leads;
a resistor between said ground potential and a source terminal of the field effect transistor; and
a power source coupled to a drain terminal of the field effect transistor.

* * * * *

UNITED STATES PATENT AND TRADEMARK OFFICE
CERTIFICATE OF CORRECTION

PATENT NO. : 4,792,682

DATED : December 20, 1988

INVENTOR(S) : Yasushi Endou, Hisao Takahashi and Tetsuaki Kon

It is certified that error appears in the above-identified patent and that said Letters Patent is hereby corrected as shown below:

Cover page, first col., please change the second and third names of the Assignee "Kaqaka Koquo" to --Kagaku Kogyo--.

Col. 1, line 18, please change "an an" to --as an--.

Col. 2, line 41, please change "two electrode" to --two electrodes--.

Col. 4, line 5, please change "molecllar" to --molecular--.

Col. 4, line 63, there should be an --a-- placed before the word "blackened".

Col. 5, line 33, please change "Tt" to --It--.

Col. 5, line 40, please change "In case where the both" to --In a case where both--.

Col. 5, line 44, please change "the both" to --both--.

Col. 5, lines 47-48, please change "tranmissive" to --transmissive--.

Col. 5, line 59, please change "pyooelectric" to --pyroelectric--.

Col. 6, line 5, please change "position of orthogonal the lines" to --position of orthogonal lines--.

UNITED STATES PATENT AND TRADEMARK OFFICE
CERTIFICATE OF CORRECTION

PATENT NO. : 4,792,682

DATED : December 20, 1988

INVENTOR(S) : Yasushi Endou, Hisao Takahashi and Tetsuaki Kon

It is certified that error appears in the above-identified patent and that said Letters Patent is hereby corrected as shown below:

Col. 6, line 60, please change "side" to --sides--.

Col. 6, line 61, please change "details" to --detail--.

Col. 7, line 19, please change "ad" to --and--.

Col. 7, line 20, please change "side" to --sides--.

Col. 7, line 32, between the words "of" and "ring", please insert the word --the--.

Signed and Sealed this

First Day of August, 1989

Attest:

DONALD J. QUIGG

Attesting Officer

Commissioner of Patents and Trademarks